US006958561B2

(12) United States Patent
Liao

(10) Patent No.: US 6,958,561 B2
(45) Date of Patent: Oct. 25, 2005

(54) STATOR WINDING STRUCTURE OF A MOTOR OR A GENERATOR

(75) Inventor: Gordon Liao, Tainan Hsien (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 0 days.

(21) Appl. No.: 10/787,087

(22) Filed: Feb. 27, 2004

(65) Prior Publication Data

US 2005/0189833 A1 Sep. 1, 2005

(51) Int. Cl.[7] ............................................. H02K 3/00
(52) U.S. Cl. ....................... 310/179; 310/201; 310/254; 29/596
(58) Field of Search ............................... 310/179, 201, 310/254; 29/596

(56) References Cited

U.S. PATENT DOCUMENTS

| 268,205 | A | * | 11/1882 | Edison ......................... 310/195 |
| 1,199,097 | A | * | 9/1916 | Mueller ....................... 310/201 |
| 2,407,935 | A | * | 9/1946 | Perfetti et al. .............. 310/201 |
| 4,227,108 | A | * | 10/1980 | Washizu et al. ............. 310/214 |
| 4,321,497 | A | * | 3/1982 | Long ........................... 310/198 |
| 5,422,526 | A | * | 6/1995 | Kawabata et al. ........... 310/201 |
| 5,773,905 | A | * | 6/1998 | Hill ............................. 310/201 |
| 5,804,902 | A | * | 9/1998 | Hill ............................. 310/179 |
| 5,864,193 | A | * | 1/1999 | Katoh ......................... 310/214 |
| 6,249,956 | B1 | * | 6/2001 | Maeda et al. ................. 29/596 |
| 6,252,327 | B1 | * | 6/2001 | Matsuzaki ................... 310/201 |
| 6,538,356 | B1 | * | 3/2003 | Jones .......................... 310/254 |
| 6,548,933 | B2 | * | 4/2003 | Yasuhara et al. ........... 310/203 |

* cited by examiner

Primary Examiner—Joseph Waks
(74) Attorney, Agent, or Firm—Bacon & Thomas, PLLC

(57) ABSTRACT

A stator winding structure of a motor or a generator includes plural separate different-shaped rod conductors combined to form a collective winding structure to take the place of a conventional winding structure which has a coil wire wound continuously. The different-shaped rod conductors can be designed in shape to match with the sizes of the coil slots to increase a slot occupied rate of the conductors and to prevent the conductors from bent during the coil winding process. The stator winding structure is especially applicable to a motor or a generator with large power and difficult in multi-electrode winding, facilitating winding and enhancing a slot occupied rate of the conductors and also reducing copper loss during output of large current.

6 Claims, 21 Drawing Sheets

STATOR WINDING STRUCTURE OF A MOTOR OR A GENERATOR

BACKGROUND OF THE INVENTION

1. Field of the Invention

This invention relates to a stator winding structure of a motor or a generator, particularly to one provided with separated intermediate different-shaped rod conductors combined together to form a collective winding structure to take the place of a conventional stator winding structure in which a coil wire is wound continuously. The intermediate different-shaped rod conductors in the coil slots can be designed to match with the sizes of the coil slots to increase a slot occupied rate of the conductors, able to prevent the coil wires from being bent in a winding process, applicable to a motor or a generator with large power and difficult in multi-electrode winding, and able to facilitate winding, to increase a slot occupied rate in a multi-electrode stator structure and to lower copper loss during output of large current.

2. Description of the Prior Art

Generally, a motor or a generator with concentrated winding is better than a motor or a generator with separate winding in output efficiency and output power and radiation capability if they are of the same size. In a process of winding, conventional coil conducting wires must be bent for 180 degrees when they come out of a coil slot and go into another coil slot; therefore, the larger the cross-section of the coil wires is, the more the stator electrodes will have, and the harder the winding work will become, and also the lower the slot occupied rate of the wire will be. In stator winding of a motor or a generator, collective winding is much harder than conventional divided winding. For the present, a motor or a generator with collective winding usually has a large cross-section of a coil wire and many stator electrodes, thus increasing difficulty in coil winding and heightening winding cost. Further, it is hard to bend a coil wire with an excessively large cross-section.

However, the cross-section of a coil wire should be first be taken into consideration in case a motor or a generator needs to output large power, because, when current flows through the coil wire, copper loss caused by resistance will generate extremely high heat energy and the coil wire is likely to be burned to form short circuit and subsequent danger. Therefore, the cross-section of the coil wire of the stator of a large-power motor or generator has to be enlarged as much as possible so as to diminish resistance and lower copper loss when the motor or the generator output large current.

Due to difficulty in winding of a coil wire with a large cross-section and high winding cost, a motor or a generator with collective winding is only applicable to equipment or electric carriers with small power output.

SUMMARY OF THE INVENTION

The objective of the invention is to offer a stator winding structure of a motor or a generator, provided with a silicon-steel sheet stator with a plurality of coil slots, plural different-shaped rod conductors insulated mutually to be inserted in the coil slots of the stator, and plural front conducting plates and rear conducting plates to be connected with the different rod-shaped conductors. The front and the rear conducting plates and the different rod-shaped rod conductors are connected together to form a collective winding structure in accordance with the sequence designed. In such winding structure, only the contact surfaces of the connected conductors and the connectors of a three-phase electric power are conductive, while the other surfaces of the conductors are insulated so as to avoid a short circuit.

BRIEF DESCRIPTION OF DRAWINGS

This invention will be better understood by referring to the accompanying drawings, wherein.

DETAILED DESCRIPTION OF THE PREFERRED EMBODIMENT

The stator winding structure in the present invention is a collective winding structure so the number of coil slots and the number of electrodes of rotors are related to a definite extent. The following lists are different combinations of the number of coil slots and electrodes of the rotors, which are applicable to a three-phase motor or generator with a collective winding structure.

TABLE 1

Number of coil slots/number of rotor electrodes = 0.75

| Number of coil slots | Number of rotor electrodes |
|---|---|
| 3 | 4 |
| 6 | 8 |
| 9 | 12 |
| 12 | 16 |
| 15 | 20 |
| 18 | 24 |
| 21 | 28 |
| 24 | 32 |

TABLE 2

Number of coil slots/number of rotor electrodes = 1.125

| Number of coil slots | Number of rotor electrodes |
|---|---|
| 9 | 8 |
| 18 | 16 |
| 27 | 24 |
| 36 | 32 |
| 45 | 40 |

TABLE 3

Number of coil slots/number of rotor electrodes = 1.5

| Number of coil slots | Number of rotor electrodes |
|---|---|
| 3 | 2 |
| 6 | 4 |
| 9 | 6 |
| 12 | 8 |
| 15 | 10 |
| 18 | 12 |
| 21 | 14 |
| 24 | 16 |

TABLE 4 other combinations (only listed to 33 slots)

| Number of coil slots | Number of rotor electrodes |
|---|---|
| 12 | 10 |
| 12 | 18 |
| 18 | 14 |
| 21 | 16 |
| 24 | 20 |
| 27 | 18 |
| 27 | 20 |
| 27 | 22 |
| 30 | 20 |
| 30 | 22 |

TABLE 4-continued other combinations (only listed to 33 slots)

| Number of coil slots | Number of rotor electrodes |
|---|---|
| 30 | 26 |
| 33 | 22 |
| 33 | 26 |
| 33 | 28 |

Figure 1:
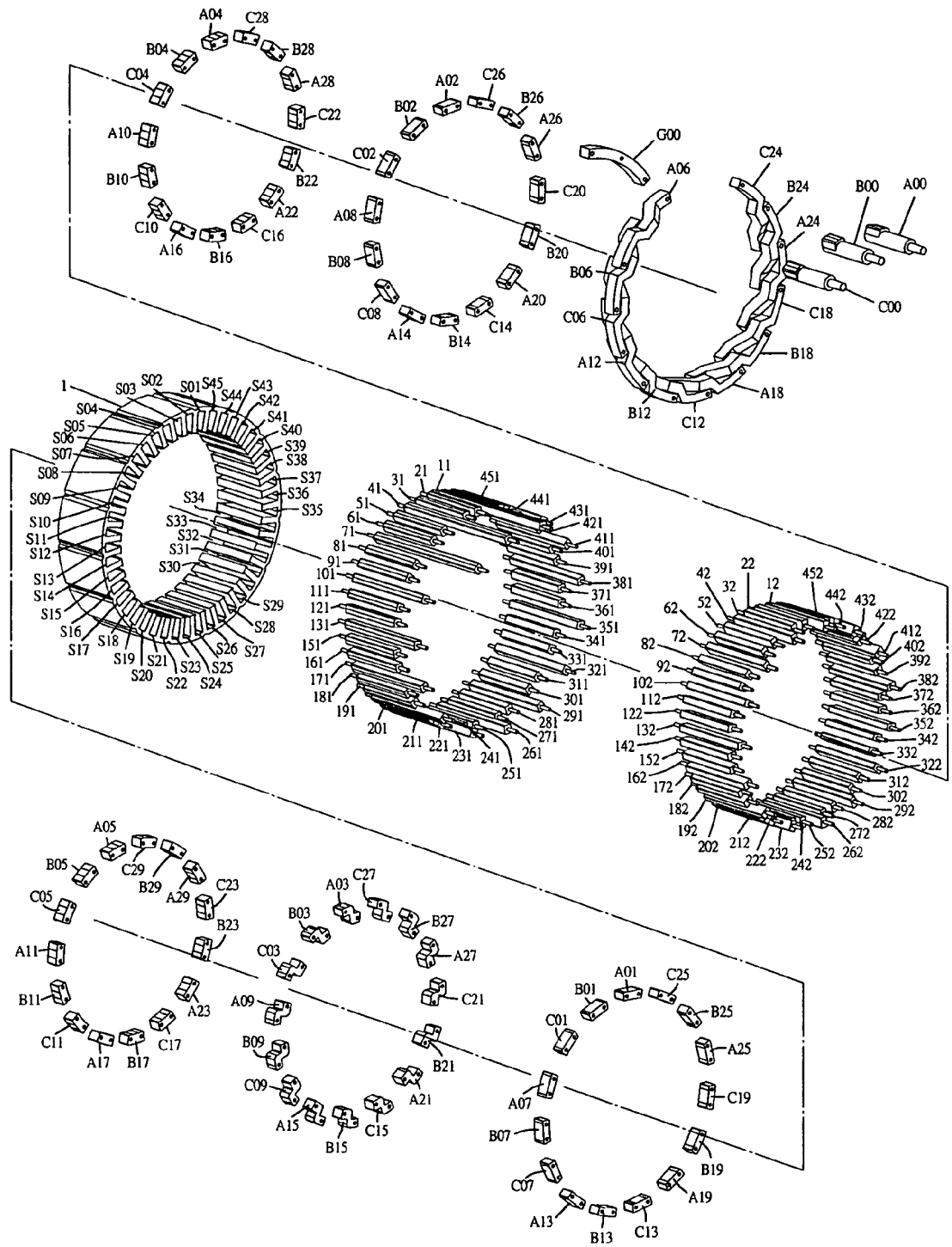
FIG. 1 is an exploded perspective view of a first preferred embodiment of a stator in the present invention.
Figure 2:
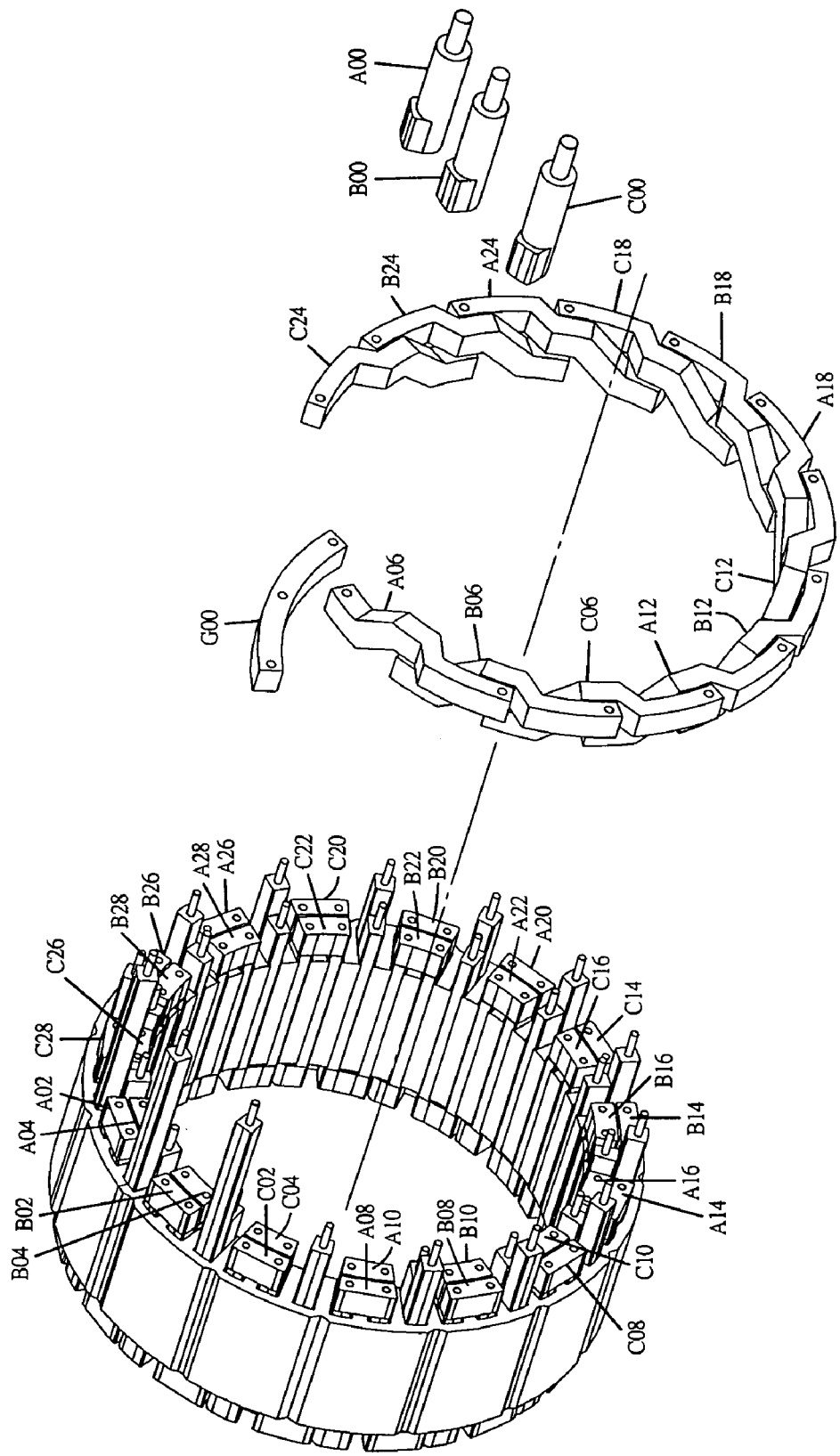
FIG. 2 is an exploded perspective view of the first preferred embodiment of stator coil slots in the present invention.
Figure 3:
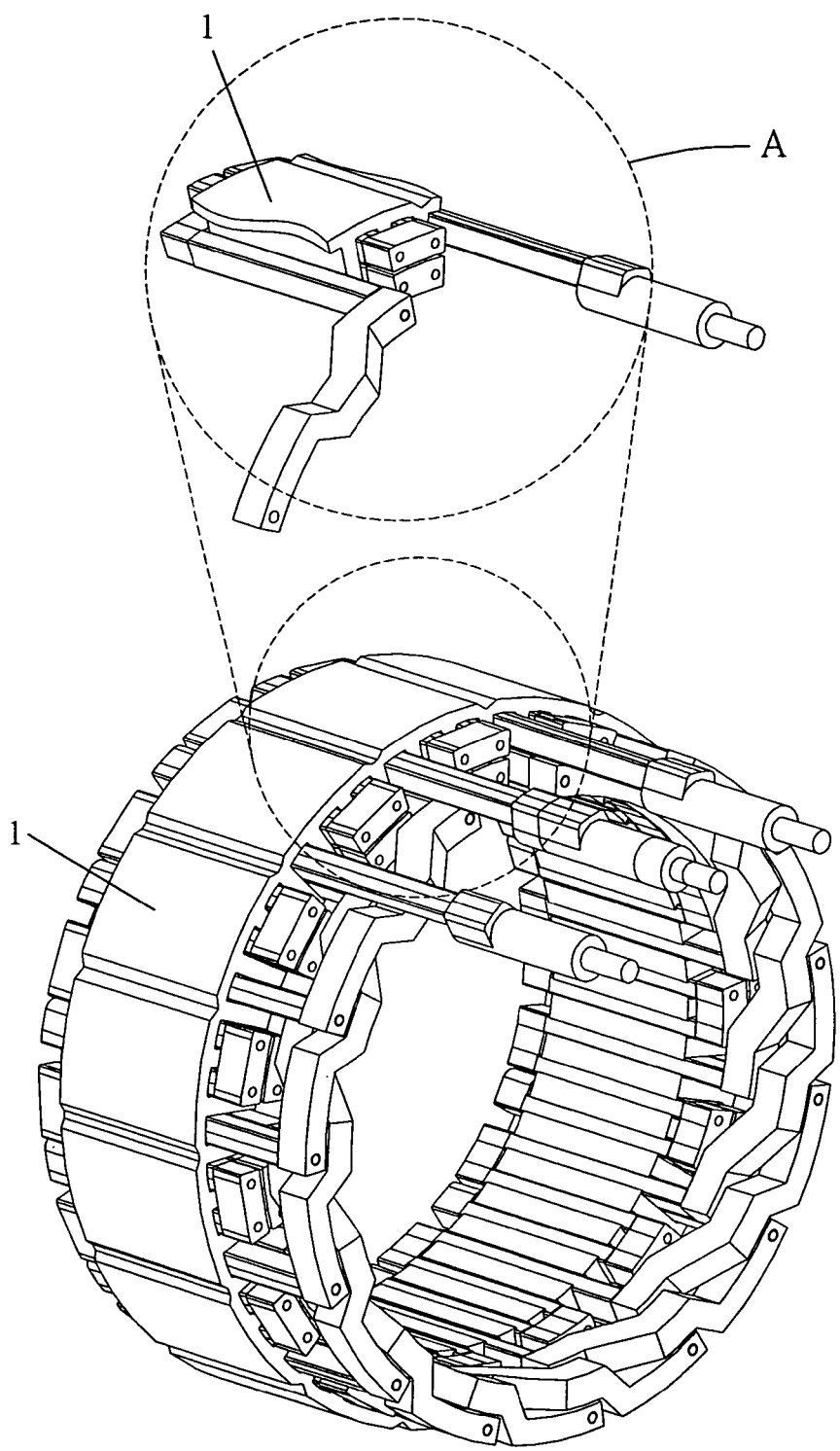
FIG. 3 is a front perspective view of the first preferred embodiment of the stator coil slots in the present invention.
Figure 4:
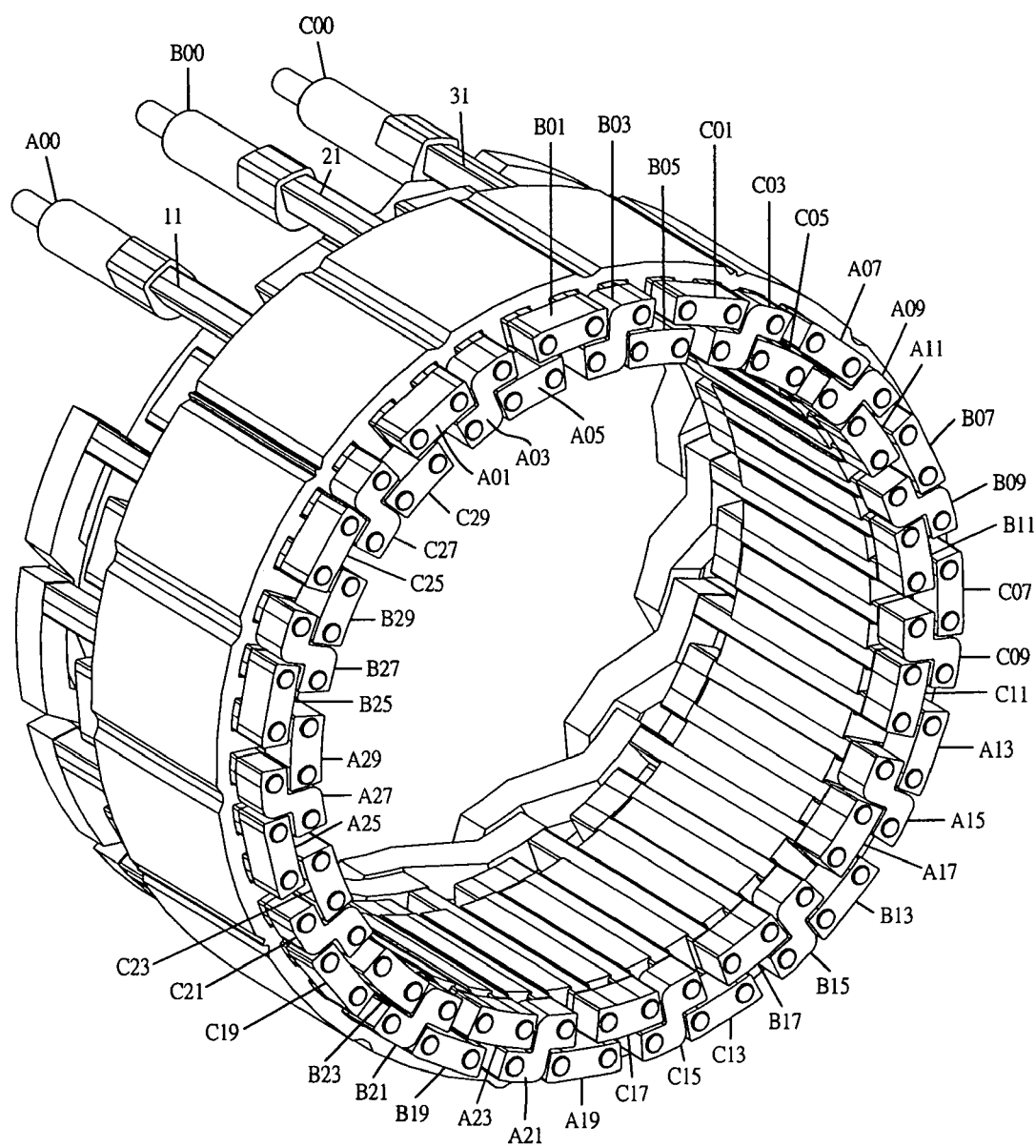
FIG. 4 is a rear perspective view of the first preferred embodiment of the stator coil slots in the present invention.
Figure 5:
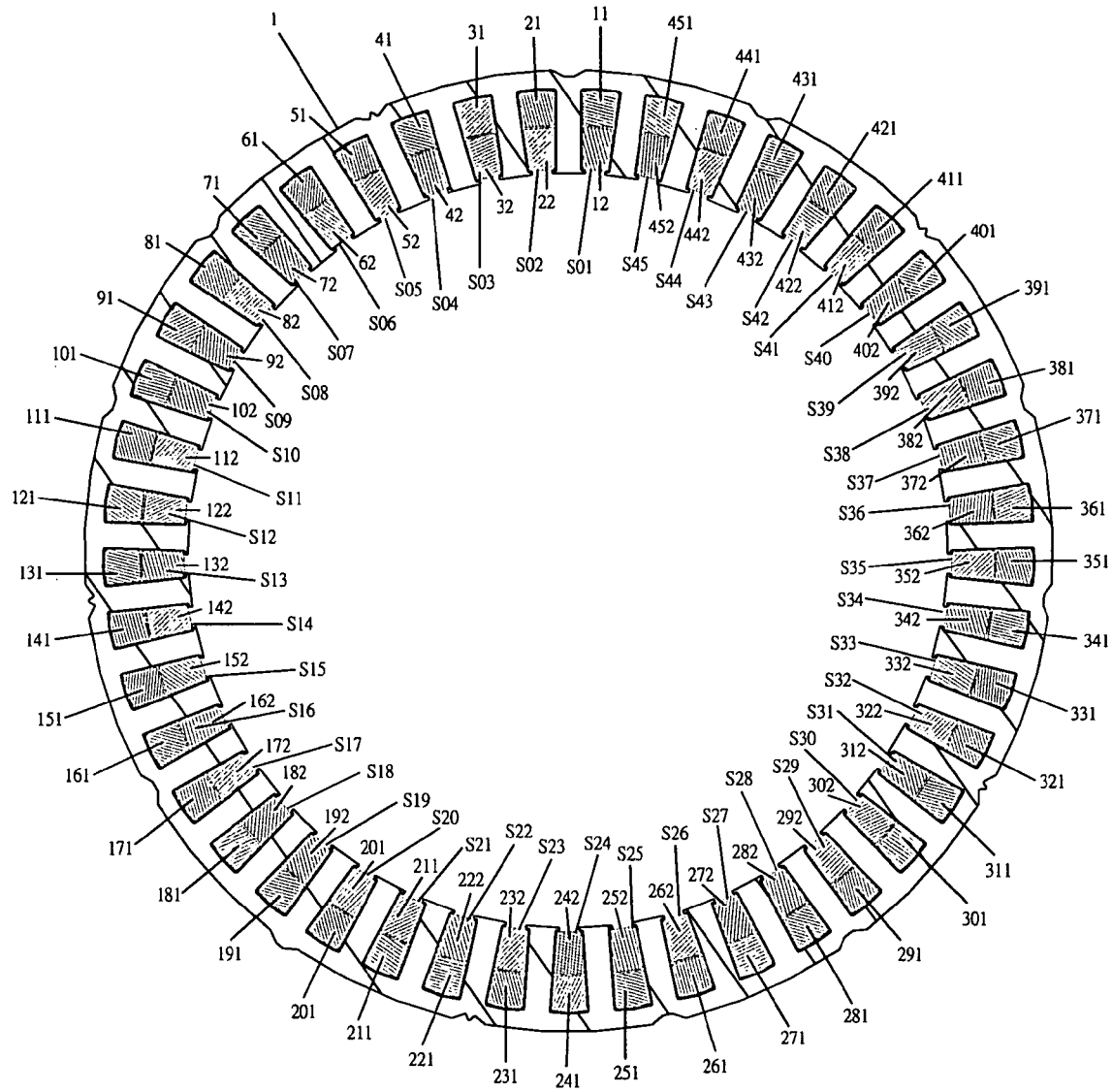
FIG. 5 is a cross-sectional view of the first preferred embodiment of the stator coil slots in the present invention.

A first preferred embodiment of the stator winding structure of a three-phase inner rotor motor in the present invention, as shown in FIGS. 1 to 9, includes a stator 1 with 45 coil slots, two intermediate different-shaped rod conductors having the same cross-section and insulated mutually as shown in FIG. 5, and a plurality of front conductors and rear conductors connected together.

The sequence of inserting the intermediate different-shaped rod conductors in the coil slots is described as follows.

Intermediate different-shaped rod conductors 11, 12 are inserted in the slot (S01), intermediate different-shaped rod conductors 21, 22 inserted in the slot (S02), intermediate different-shaped rod conductors 31, 32 inserted in the slot (S03), intermediate different-shaped rod conductors 41, 42 inserted in the slot (S04), intermediate different-shaped rod conductors 51, 52 inserted in the slot (S05), intermediate different-shaped rod conductors 61, 62 inserted in the slot (S06), intermediate different-shaped rod conductors 71, 72 inserted in the slot (S07), intermediate different-shaped rod conductors 81, 82 inserted in the slot (S08), intermediate different-shaped rod conductors 91, 92 inserted in the slot (S09), intermediate different-shaped rod conductors 101, 102 inserted in the slot (S10), intermediate different-shaped rod conductors 111, 112 inserted in the slot (S11), intermediate different-shaped rod conductors 121, 122 inserted in the slot (S12), intermediate different-shaped rod conductor 141, 142 inserted in the slot (S14), intermediate different-shaped rod conductors 151, 152 inserted in the slot (S15), intermediate different-shaped rod conductor 161, 162 inserted in the slot (S16), intermediate different-shaped rod conductors 171, 172 inserted in the slot (S17), intermediate different-shaped rod conductors 181, 182 inserted in the slot (S18), intermediate different-shaped rod conductors 191, 192 inserted in the slot (S19), intermediate different-shaped rod conductors 201, 202 inserted in the slot (S20), intermediate different-shaped rod conductors 211, 212 inserted in the slot (S21), intermediate different-shaped rod conductors 221, 222 inserted in the slot (S22), intermediate different-shaped rod conductors 231, 232 inserted in the slot (S23), intermediate different-shaped rod conductors 241, 242 inserted in the slot (S24), intermediate different-shaped rod conductors 251, 252 inserted in the slot (S25), intermediate different-shaped rod conductors 261, 262 inserted in the slot (S26), intermediate different-shaped rod conductors 271, 272 inserted in the slot (S27), intermediate different-shaped rod conductors 282, 282 inserted in the slot (S28), intermediate different-shaped rod conductors 292, 292 inserted in the slot (S29), intermediate different-shaped rod conductors 301, 302 inserted in the slot (S30), intermediate different-shaped rod conductors 311, 312 inserted in the slot (S31), intermediate different-shaped rod conductors 321, 322 inserted in the slot (S32), intermediate different-shaped rod conductors 331, 332 inserted in the slot (S33), intermediate different-shaped rod conductors 341, 342 inserted in the slot (S34), intermediate different-shaped rod conductors 351, 352 inserted in the slot (S35), intermediate different-shaped rod conductors 361, 362 inserted in the slot (S36), intermediate different-shaped rod conductors 371, 372 inserted in the slot (S37), intermediate different-shaped rod conductors 281, 382 inserted in the slot (S38), intermediate different-shaped rod conductors 391, 392 inserted in the slot (S39), intermediate different-shaped rod conductors 401, 402 inserted in the slot (S40), intermediate different-shaped rod conductors 411, 412 inserted in the slot (S41), intermediate different-shaped rod conductors 421, 422 inserted in the slot (S42), intermediate different-shaped rod conductors 431, 432 inserted in the slot (S43), intermediate different-shaped rod conductors 441, 442 inserted in the slot (S44), and intermediate different-shaped rod conductors 451, 452 inserted in the slot (S45).

According to the sequence of the collective winding structure, each rod conductor has its opposite ends respectively connected with the input terminals (A00), (B00), (C00) of three-phase power and the front conductor (A02, A04, A06, A08, A10, A12, A14, A16, A18, AA20, A22, A24, A26, A28, B02, B04, B06, B08, B10, B12, B14, B16, B18, B20, B22, B24, B26, B28, C02, C04, C06, C08, C10, C12, C14, C16, C18, C20, C22, C24, C26, C28, G00) and the rear conductor (A01, A03, A05, A07, A09, A11, A13, A15, A17, A19, A21, A23, A25, A27, A29, B01, B03, B05, B07 B09, B11, B13, B15, B17, B19, B21, B23, B25, B27, B29, C01, C03, C05, C07, C09, C11, C13, C15, C17, C19, C21, C23, C25, C27, C29).

Each front conductor and each rear conductor is respectively bored with two position holes 10, and each intermediate different-shaped rod conductor has the opposite ends respectively provided with a position pin 20 to be orderly inserted in the position hole 10 of the front and the rear conductor. Then, the connected portions of the intermediate different-shaped rod conductors with the input terminals of the three-phase power and the front and the rear conductors are connected by firm combination or by soldering. The contact surfaces of the connected conductors and the connectors of the three-phase power are conductive, but the other surfaces of the conductors are insulated to avoid a short circuit.

Figure 6:
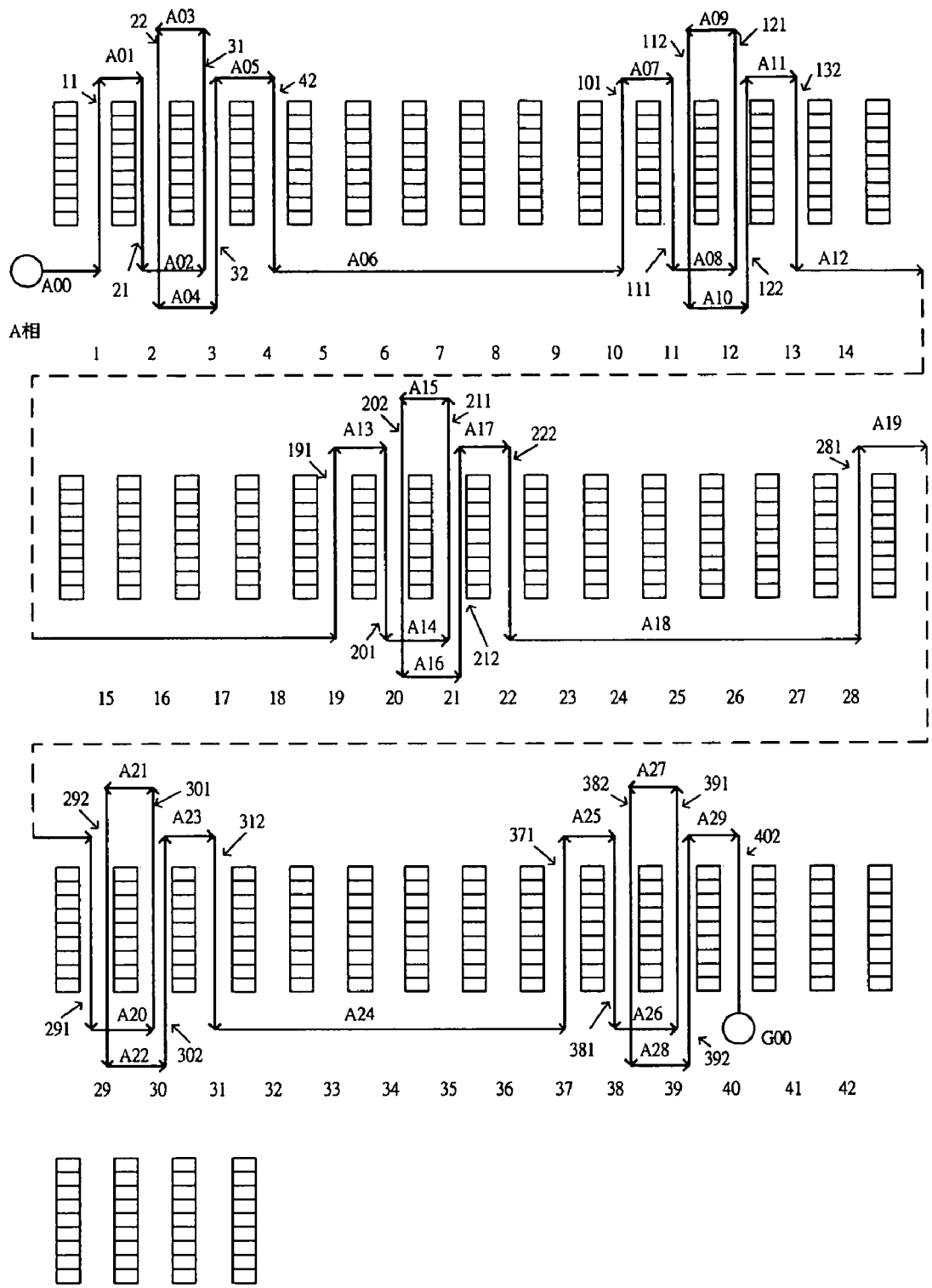
FIG. 6 is an evolved view of the first preferred embodiment of an A-phase coil winding structure and current flowing directions in the present invention.

According to the given numbers, the connecting sequence of the conductors, taking A-phase coil winding for example, is described as follows, as shown in FIG. 6, assuming that coil winding and coil slots are flattened.

The input terminal (A00) of the A-phase power is connected with the intermediate different-shaped rod conductor 11 in the coil slot (S01), and the intermediate different-shaped rod conductor 11 has the other end connected with the intermediate different-shaped rod conductor 21 in the coil slot (S02) by the rear conductor (A01). Then, the intermediate different-shaped rod conductor 21 in the coil slot (S02) has the other end connected with the intermediate different-shaped rod conductor 31 in the coil slot (S03) by the front conductor (A02), and the intermediate different-shaped rod conductor 31 in the coil slot (S03) has the other end connected with the intermediate different-shaped rod conductor 22 in the coil slot (S02) by the rear conductor (A03). Then, the intermediate different-shaped rod conductor 22 in the coil slot (S02) has the other end connected with the intermediate different-shaped rod conductor 32 in the coil slot (S03) by the front conductor (A04), and the intermediate different-shaped rod conductor 32 in the coil slot (S03) has the other end connected with the intermediate different-shaped rod conductor 42 in the coil slot (S04) by the rear conductor (A05), and the intermediate different-shaped rod conductor 42 in the coil slot (S04) has the other end connected with the intermediate different-shaped rod conductor 101 in the coil slot (S10) by the front conductor (A06), and then repeat the above-mentioned steps. According to the given number, the combining sequence of the intermediate different-shaped rod conductors with the front conductors, and the rear conductors is: A00, 11, A01, 21, A02, 31, A03, 22, A04, 32, A05, 42, A06, 101, A07, 111, A08, 121, A09, 112, A10, 122, A11, 132, A12, 191, A13, 201, A14, 211, A15, 202, A16, 212, A17, 222, A18, 281, A19, 291, A20, 301, A21, 292, A22, 302, A23, 312, A24, 371, A25, 381, A26, 391, A27, 382, A28, 392, A29, 402, G00.

Figure 7:
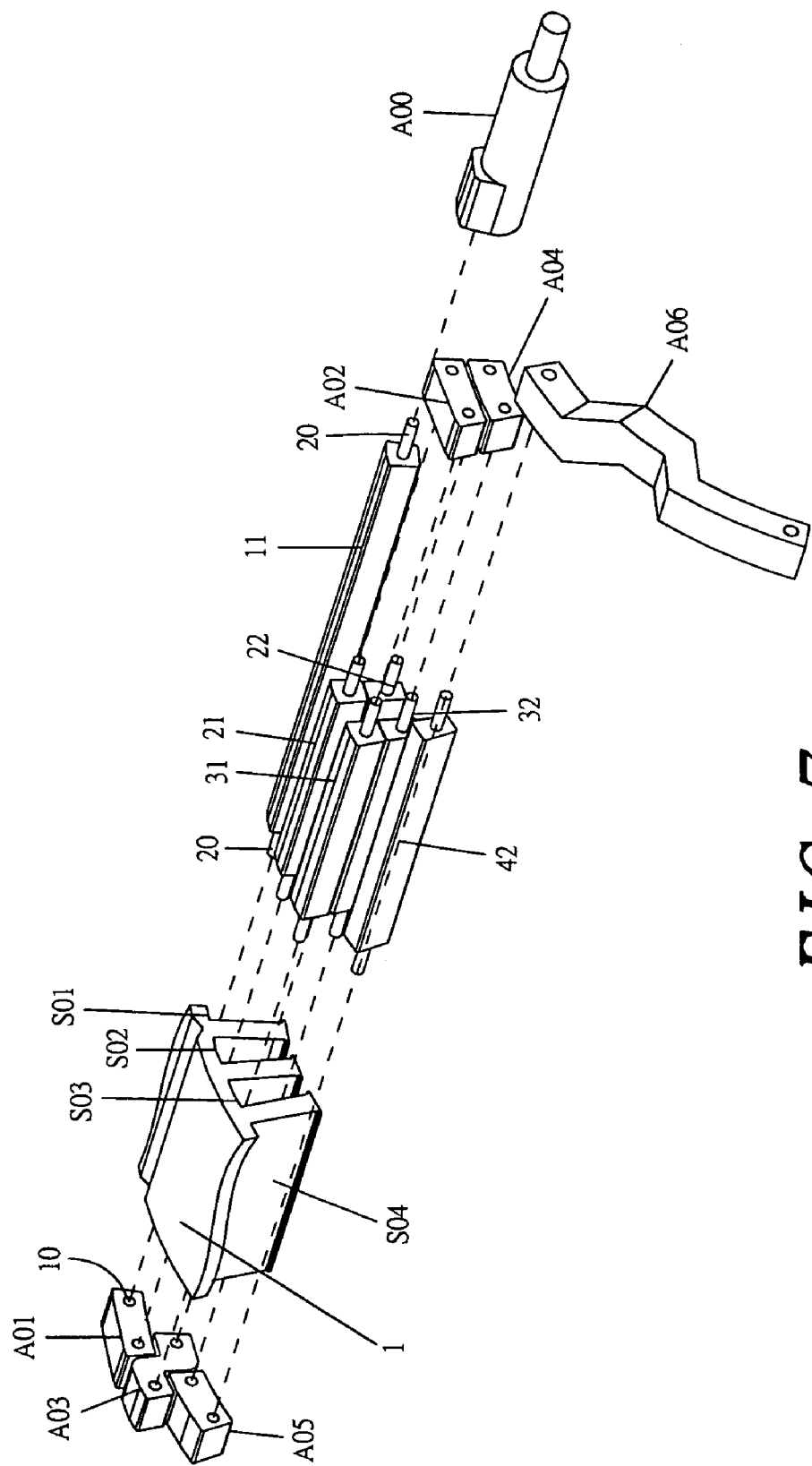
FIG. 7 is an exploded perspective view of the portion A in FIG. 3.

FIG. 7 shows a partial A-phase coil of the 45-slot stator 1 of an inner rotor motor. The input terminal (A00) of the A-phase power and the front conductors (A02), (A04), (A06) and the intermediate different-shaped rod conductors 11, 21, 22, 31, 32, 42 and the rear conductors (A01), (A03), (A05) are connected together to form a collective winding structure having two conductors respectively positioned in the coil slot (S01), (S02), (S03) and (S04) of the stator 1. Each front conductor and each rear conductor are respectively bored with two position holes 10, and each intermediate different-shaped rod conductor has its opposite ends respectively provided with a position pin 20 to be orderly inserted in the position hole of the front and the rear conductor. Then, the connected portions of the intermediate different-shaped rod conductors with the front and the rear conductors are connected by tight combination or by soldering. The contact surfaces of the connected conductors and the connectors of the three-phase current supply are conductible, but the other surfaces of the conductors are insulated to avoid short circuit.

Figure 8:
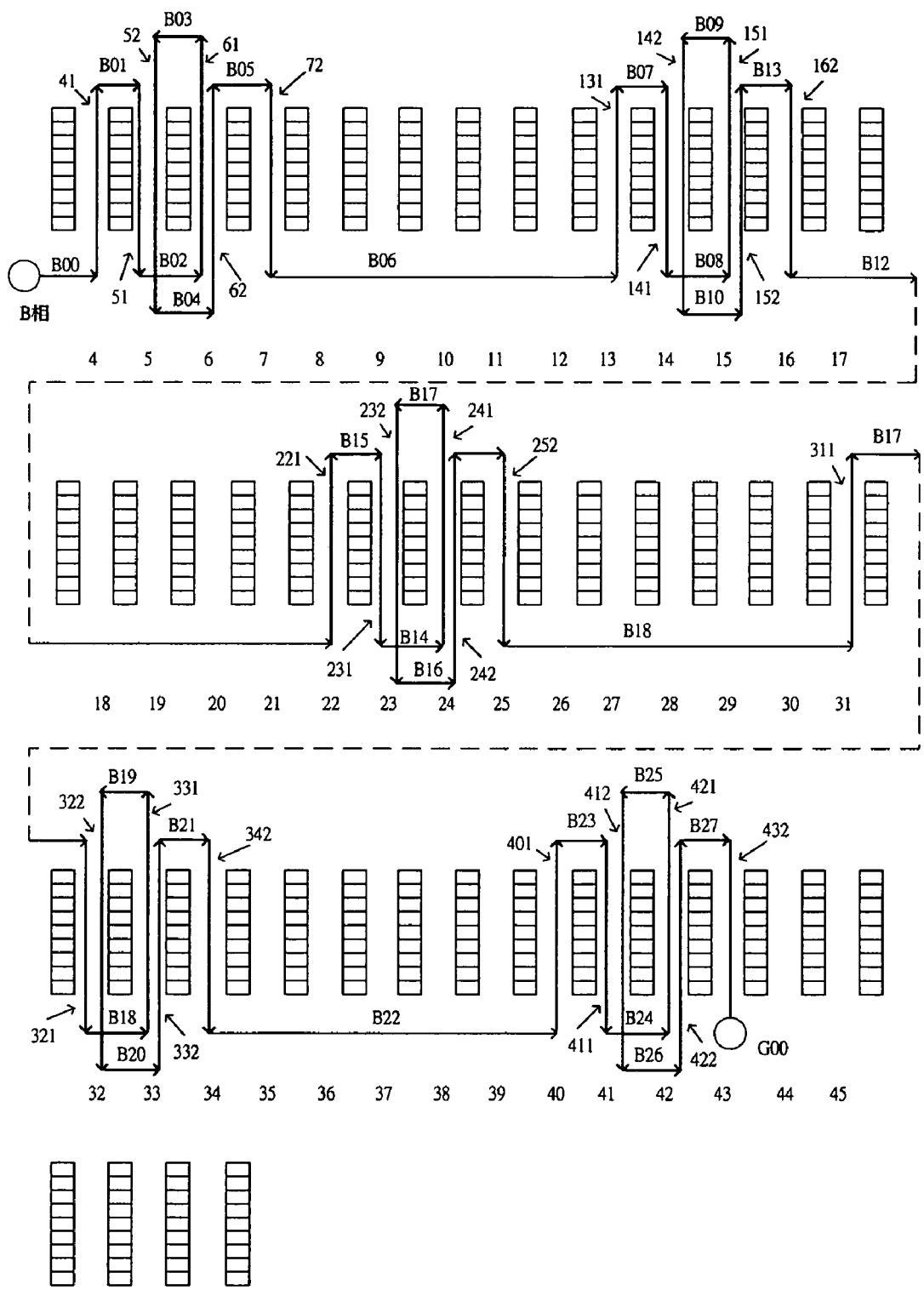
FIG. 8 is an evolved view of the first preferred embodiment of a B-phase coil winding structure and current flowing directions in the present invention.

The connecting sequence of the conductors in B-phase coil winding is described as follows, as shown in FIG. 8, assuming that the coil winding and the coil slots are flattened.

The input terminal (B00) of the B-phase power is connected with the intermediate different-shaped rod conductor 41 in the coil slot (S04) and the other end of the intermediate different-shaped rod conductor 41 is connected with the intermediate different-shaped rod conductor 51 in the coil slot (S05) by the rear conductor (B01). Then, the intermediate different-shaped rod conductor 51 in the coil slot (S05) has the other end connected with the intermediate different-shaped rod conductor 61 in the coil slot (S06) by the front conductor (B02) and the intermediate different-shaped rod conductor 61 in the coil slot (S06) has the other end connected with the intermediate different-shaped rod conductor 52 in the coil slot (S05) by the rear conductor (B03). Then, the intermediate different-shaped rod conductor 52 in the coil slot (S05) has the other end connected with the intermediate different-shaped rod conductor 62 in the coil slot (S06) by the front conductor (B04) and the intermediate different-shaped rod conductor 62 in the coil slot (S06) has the other end connected with the intermediate different-shaped rod conductor 72 in the coil slot (S07) by the rear conductor (B05), and the intermediate different-shaped rod conductor 72 in the coil slot (S07) has the other end connected with the intermediate different-shaped rod conductor 131 in the coil slot (S13) by the front conductor (B06) and then repeat the foresaid steps. In accordance with the given number, the connecting sequence of the intermediate different-shaped rod conductors with the front conductors and the rear conductors are listed below.

B00, 41, B01, 51, B02, 61, B03, 52, B04, 62, B05, 72, B06, 131, B07, 141, B08, 151, B09, 142, B10, 152, B11,

162, B12, 221, B13, 231, B14, 241, B15, 232, B16, 242, B17, 252, B18, 311, B19, 321, B20, 331, B21, 322, B22, 332, B23, 342, B24, 401, B25, 411, B26, 421, B27, 412, B28, 422, B29, 432, G00.

Figure 9:
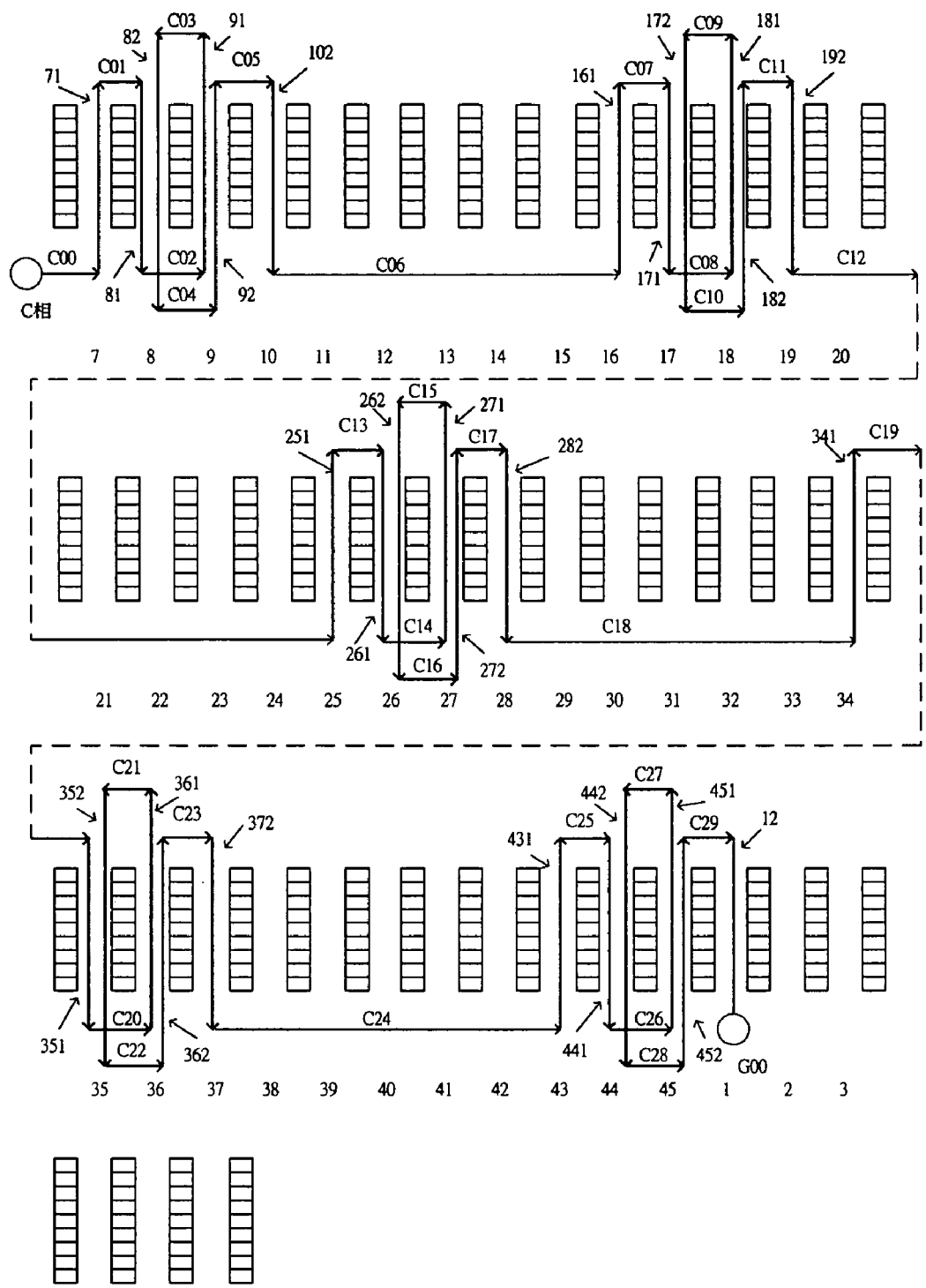
FIG. 9 is an evolved view of the first preferred embodiment of a C-phase coil winding structure and current flowing directions in the present invention.

The connecting sequence of the conductors in C-phase coil winding is described as follows, as shown in FIG. 9, assuming that the coil winding and the coil slots are flattened.

The input terminal (C00) of the C-phase current supply is connected with the intermediate different-shaped rod conductor 71 in the coil slot (S07) and the rod conductor 71 has the other end connected with the intermediate different-shaped rod conductor 81 in the coil slot (S08) by the rear conductor (C01). Then, the intermediate different-shaped rod conductor 81 in the coil slot (S08) has the other end connected with the intermediate different-shaped rod conductor 91 in the coil slot (S09) by the front conductor (S02), and the intermediate different-shaped rod conductor 91 in the coil slot (S09) has the other end conducted with the intermediate different-shaped rod conductor 82 in the coil slot (S08) by the rear conductor (C03). Then, the intermediate different-shaped rod conductor 82 in the coil slot (S08) has the other end connected with the intermediate different-shaped rod conductor 92 in the coil slot (S09) by the front conductor (C04) and the intermediate different-shaped rod conductor 92 in the coil slot (S09) has the other end connected with the intermediate different-shaped rod conductor 102 in the coil slot (S10) by the rear conductor (C05), and the intermediate different-shaped rod conductor 102 in the coil slot (S10) has the other end connected with the intermediate different-shaped rod conductor 161 in the coil slot (S16) by the front conductor (C06) and then repeat the foresaid steps. The connecting sequence of the intermediate different-shaped rod conductors with the front and the rear conductors in the C-phase winding structure is listed below. C00, 71, C01, 81, C02, 91, C03, 82, C04, 92, C05, 102, C06, 161, C07, 171, C08, 181, C09, 172, C10, 182, C11, 192, C12, 251, C13, 261, C14, 271, C15, 262, C16, 272, C17, 282, C18, 341, C19, 351, C20, 361, C21, 352, C22, 362, C23, 372, C24, 431, C25, 441, C26, 451, C27, 442, C28, 452, C29, 12, G00. Lastly, the rod conductors 402, 432 and 12 are connected by the front conductor G00 to form a short circuit.

Figure 10:
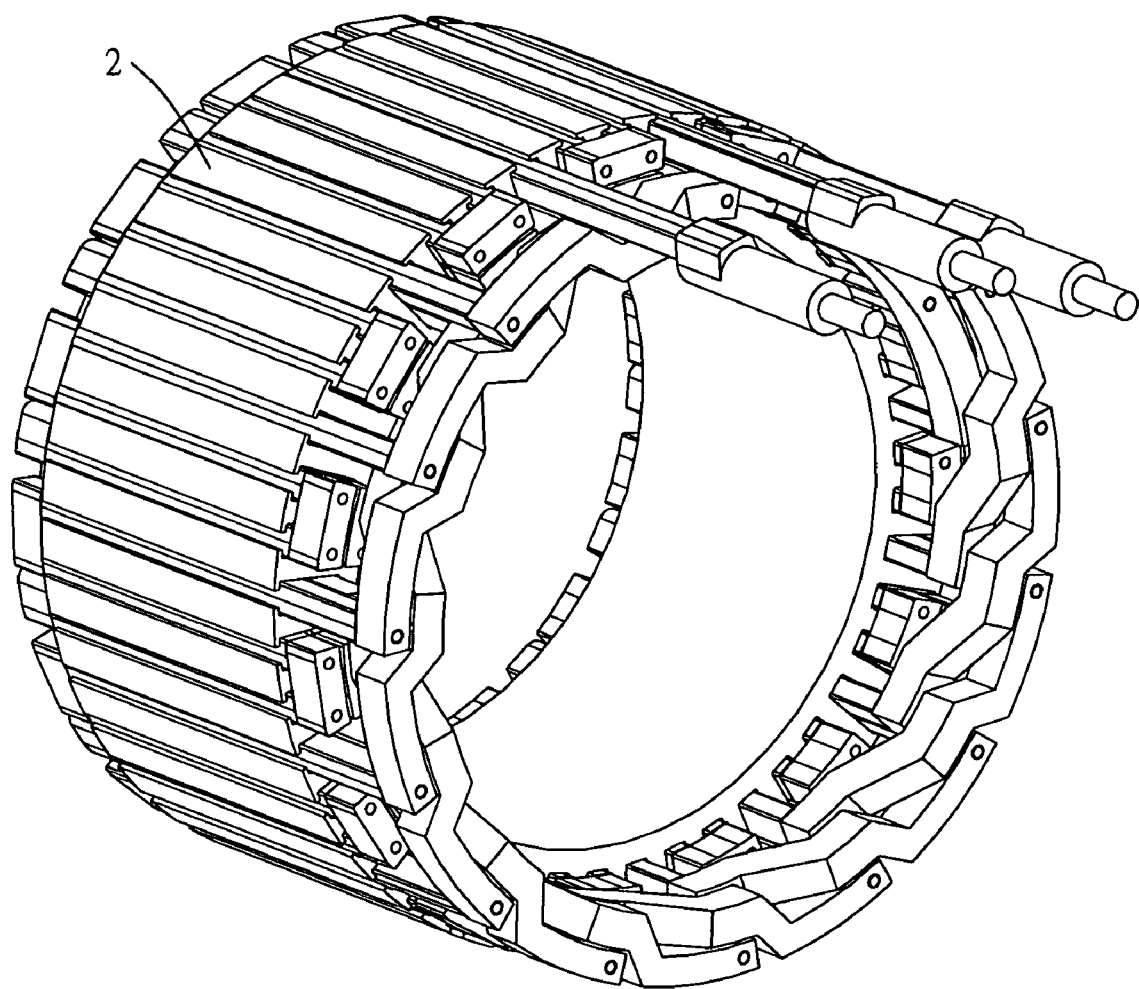
FIG. 10 is a front perspective view of a second preferred embodiment of the stator of an outer rotor motor in the present invention.
Figure 11:
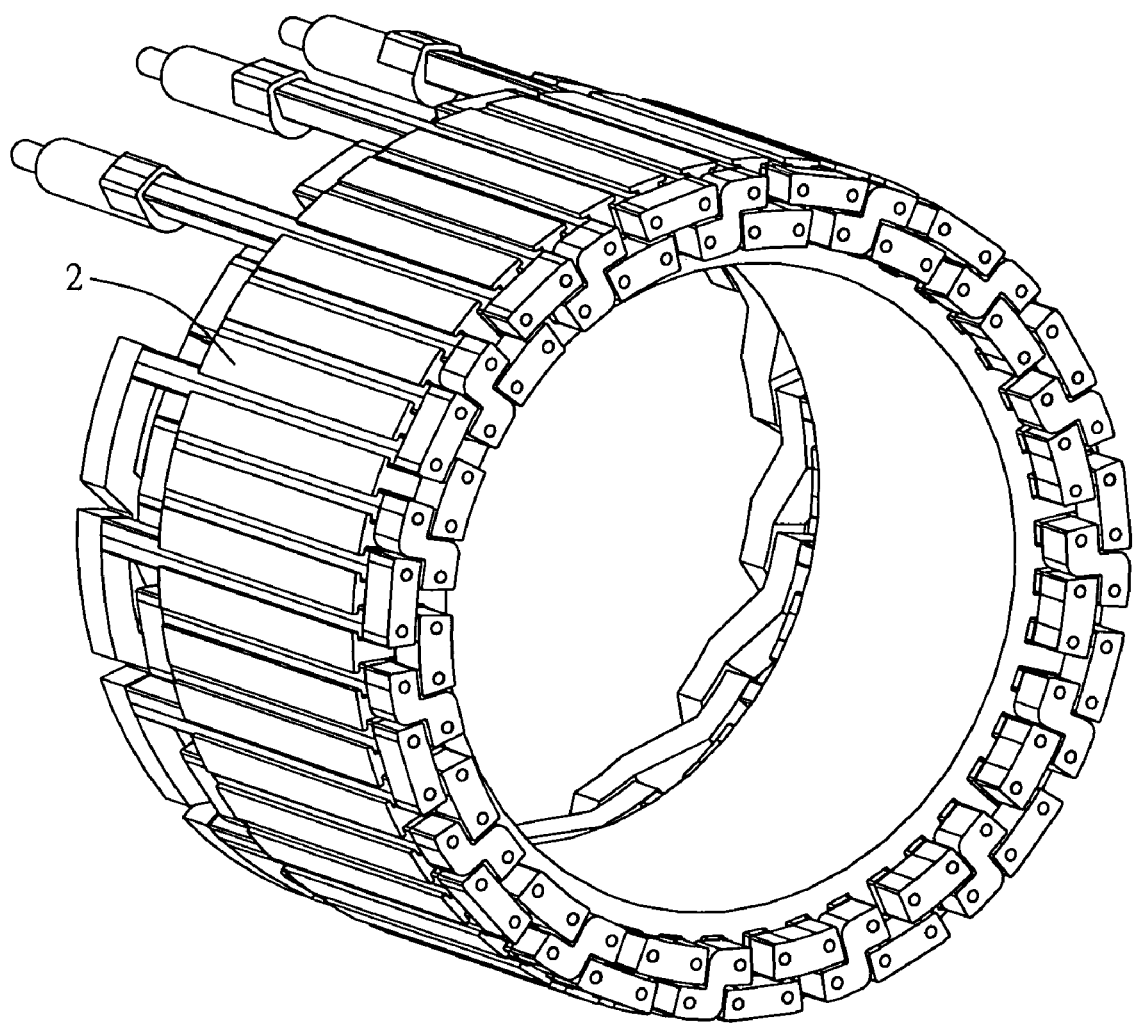
FIG. 11 is a rear perspective view of the second preferred embodiment of the stator of an outer rotor motor in the present invention.

A second preferred embodiment of a 45-slot stator winding structure of an outer rotor motor in the present invention, as shown in FIGS. 10, 11, has the same coil winding structure and connection modes as those of the 45-slot stator of the inner rotor motor described in the first preferred embodiment, except that only the open sides of the 45 coil slots of the stator 2 of the outer rotor motor face the exterior, and that the open sides of the 45 coil slots of the stator 1 of the inner rotor motor face the interior.

The stator coil winding structure of the outer rotor motor is formed by connecting the intermediate different-shaped rod conducts with the front and the rear conducts together, and these conductors can be cast or forged into U-shaped or L-shaped rod conductors to be connected to form a coil winding structure, able to decrease the number of the conductors and the contact surfaces of the winding structure, and to reduce difficulty in assembling and soldering.

Figure 12:
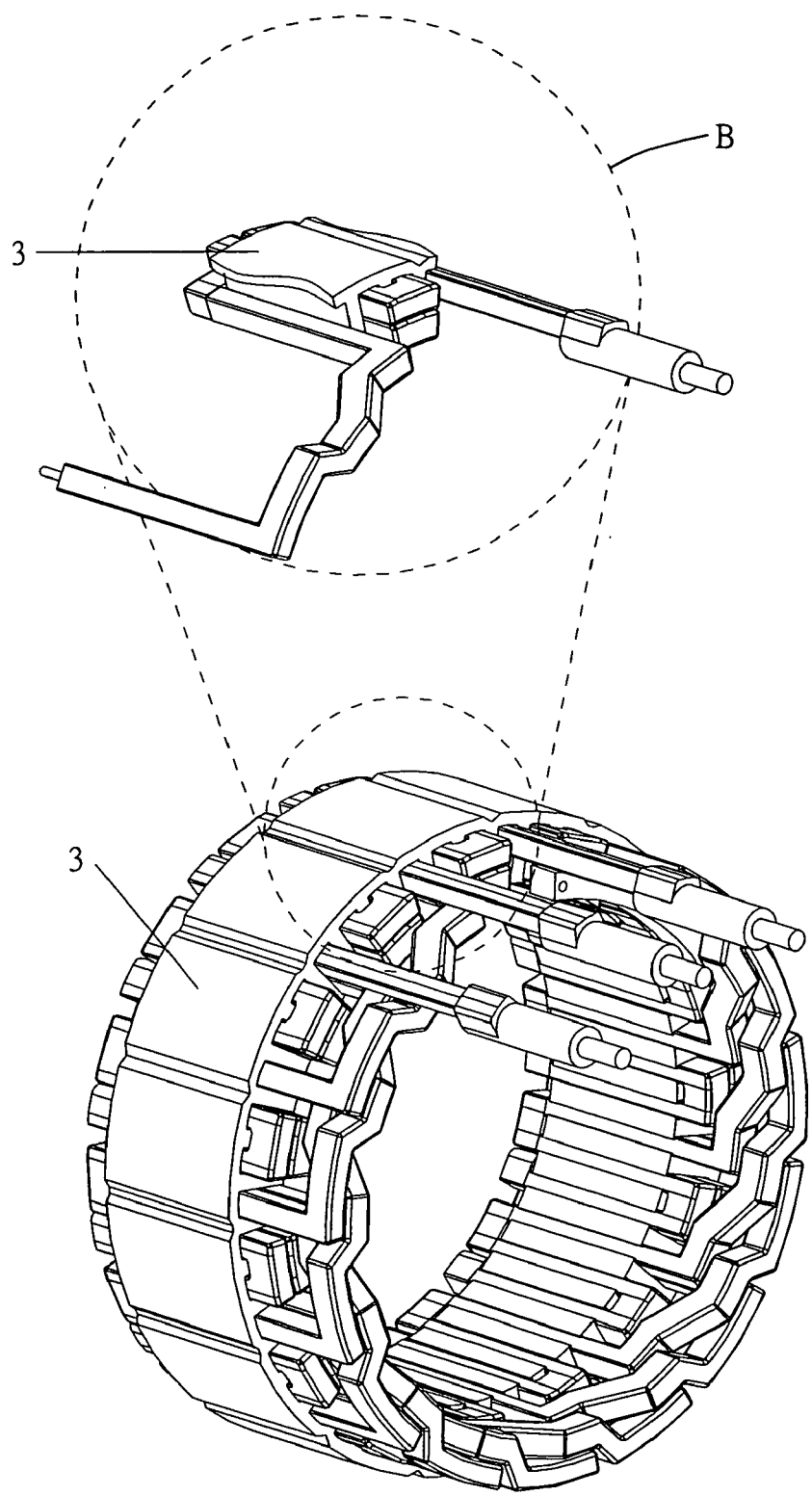
FIG. 12 is a perspective view of a third preferred embodiment of the stator of an inner rotor motor in the present invention.
Figure 13:
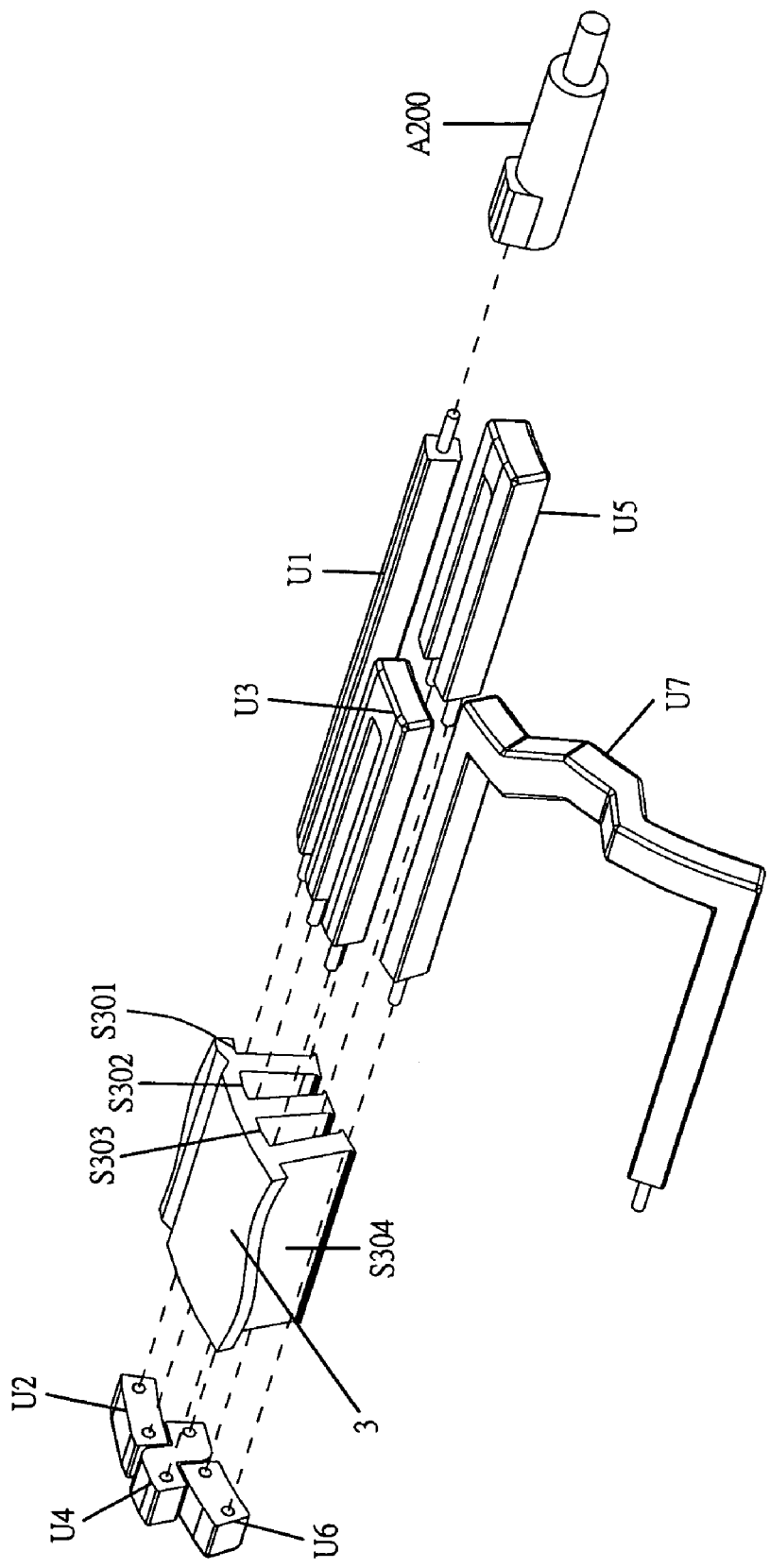
FIG. 13 is an exploded perspective view of the portion marked B in FIG. 12.

A third preferred embodiment of the stator coil winding structure of an inner rotor motor in the present invention, as shown in FIGS. 12 and 13, includes a stator 3 having 45 coil slots, plural U-shaped conductors, and plural different-shaped rod conductors and rear conductors connected together.

The coil slot (S301), (S302), (S303) and (S304) of the stator 3 are respectively inserted therein with the input terminal (A00) of A-phase power and the U-shaped conductors (U3), (U5), (U7) and the different-shaped rod conductor (U1) and the rear conductors (U2), (U4), (U6) to form a collective winding structure having two conductors positioned in each coil slot.

Figure 14:
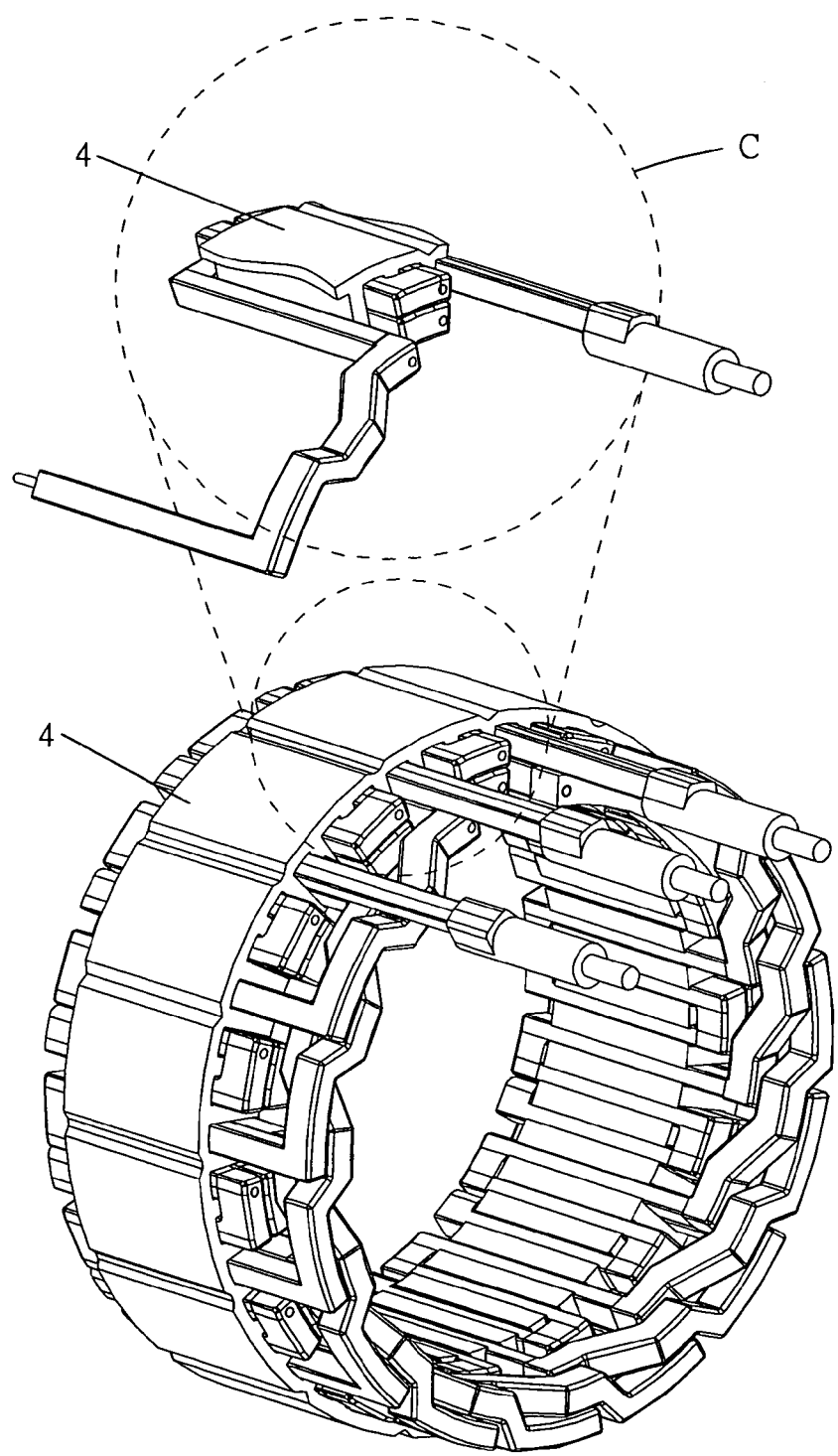
FIG. 14 is a perspective view of a fourth preferred embodiment of the stator of an inner rotor motor in the present invention.
Figure 15:
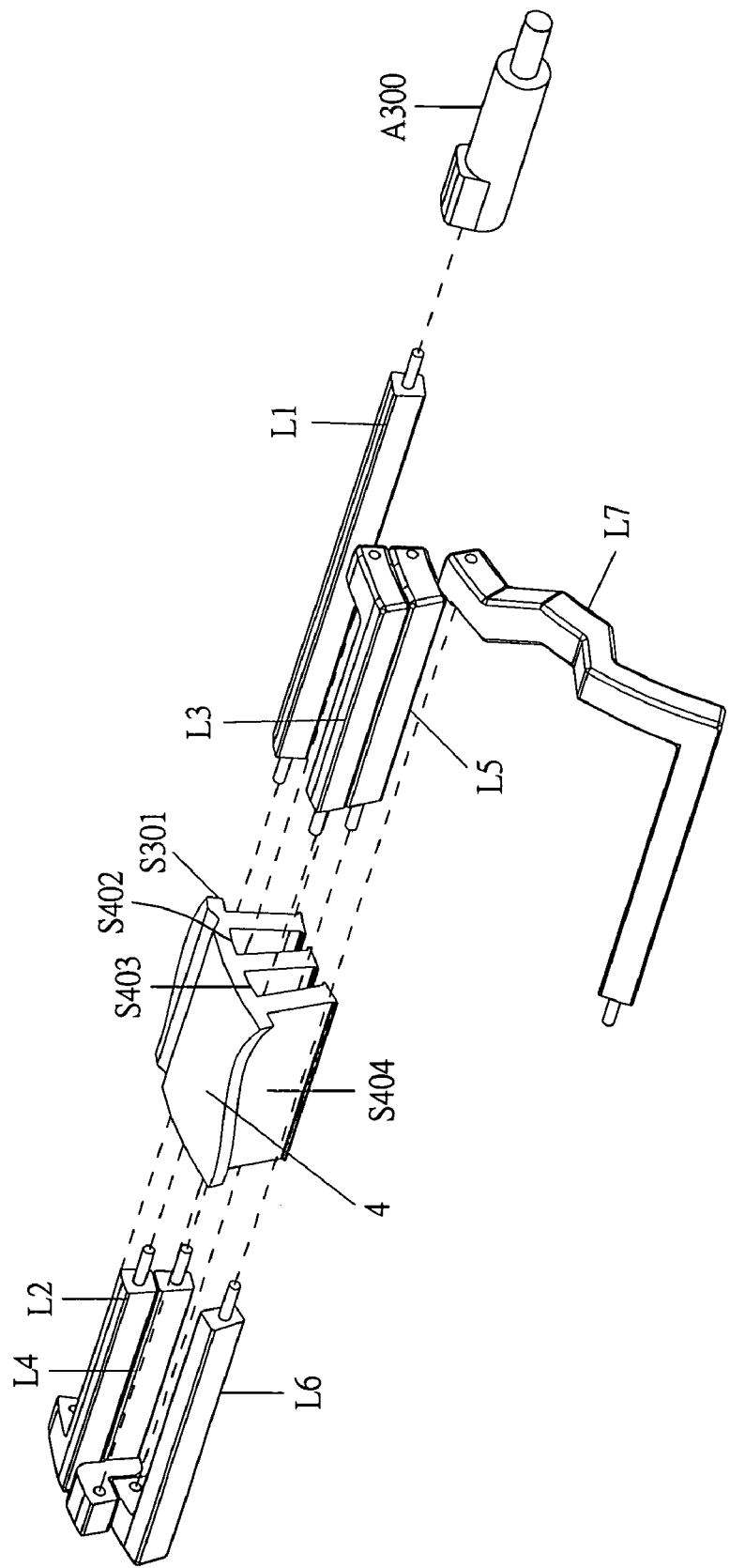
FIG. 15 is an exploded perspective view of the portion marked C in FIG. 14.

A fourth preferred embodiment of the stator coil winding structure of an inner rotor motor in the present invention, as shown in FIGS. 14 and 15, includes a stator 4 having 45 coil slots, plural L-shaped conductors and plural different-shaped rod conductors connected together.

The coil slots (S401), (S402), (S403) and (S404) of the stator 4 are respectively inserted therein with the input terminal (A300) of A-phase power and the L-shaped conductors L2, L3, L4, L5, L6, L7 and the different-shaped rod conductor L1 to form a collective winding structure having two conductors positioned in each coil slot.

Figure 16:
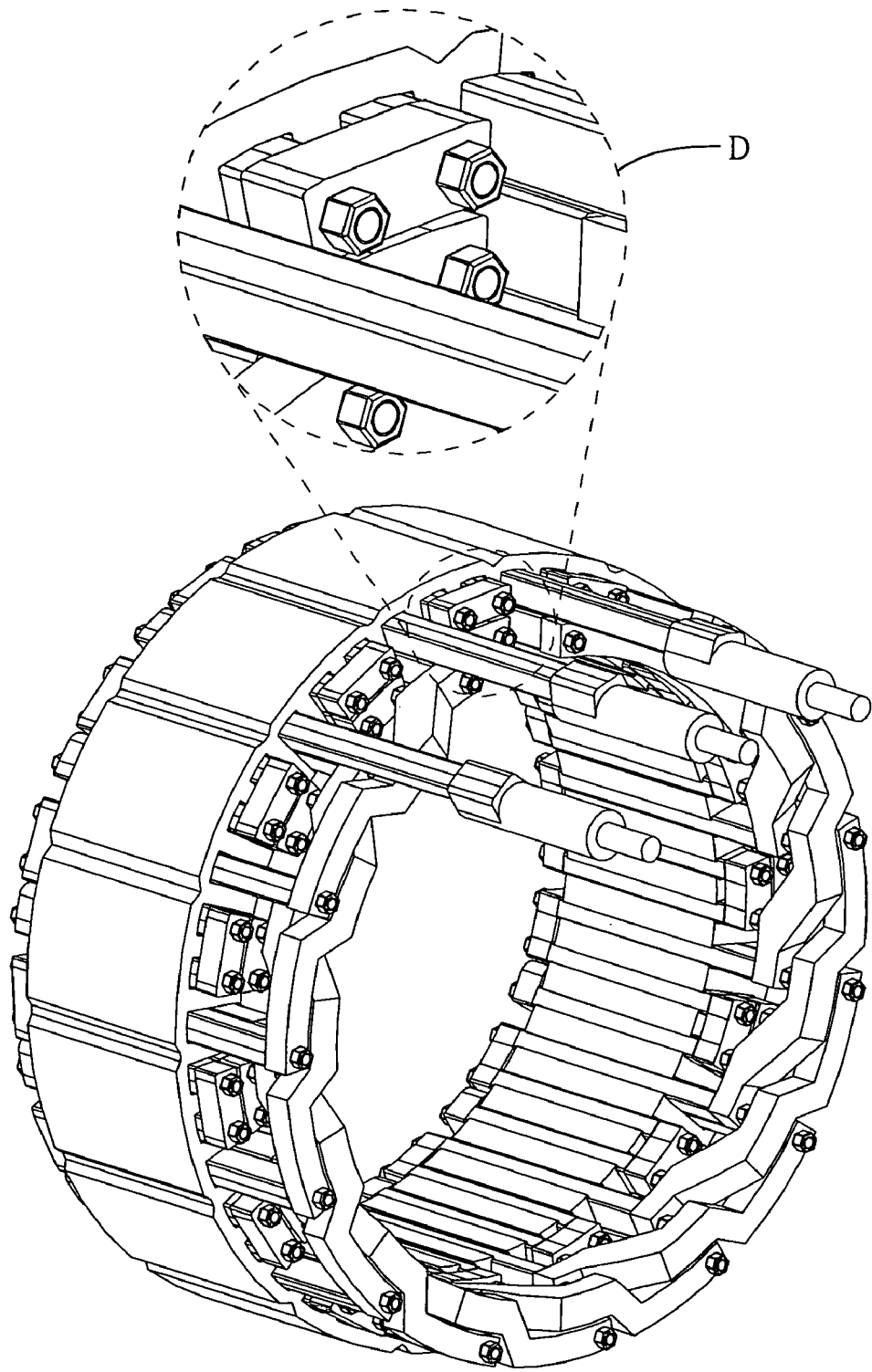
FIG. 16 is a perspective view of a fifth preferred embodiment of an inner rotor motor having two conductors in each coil slot connected by nuts in the present invention.
Figure 17:
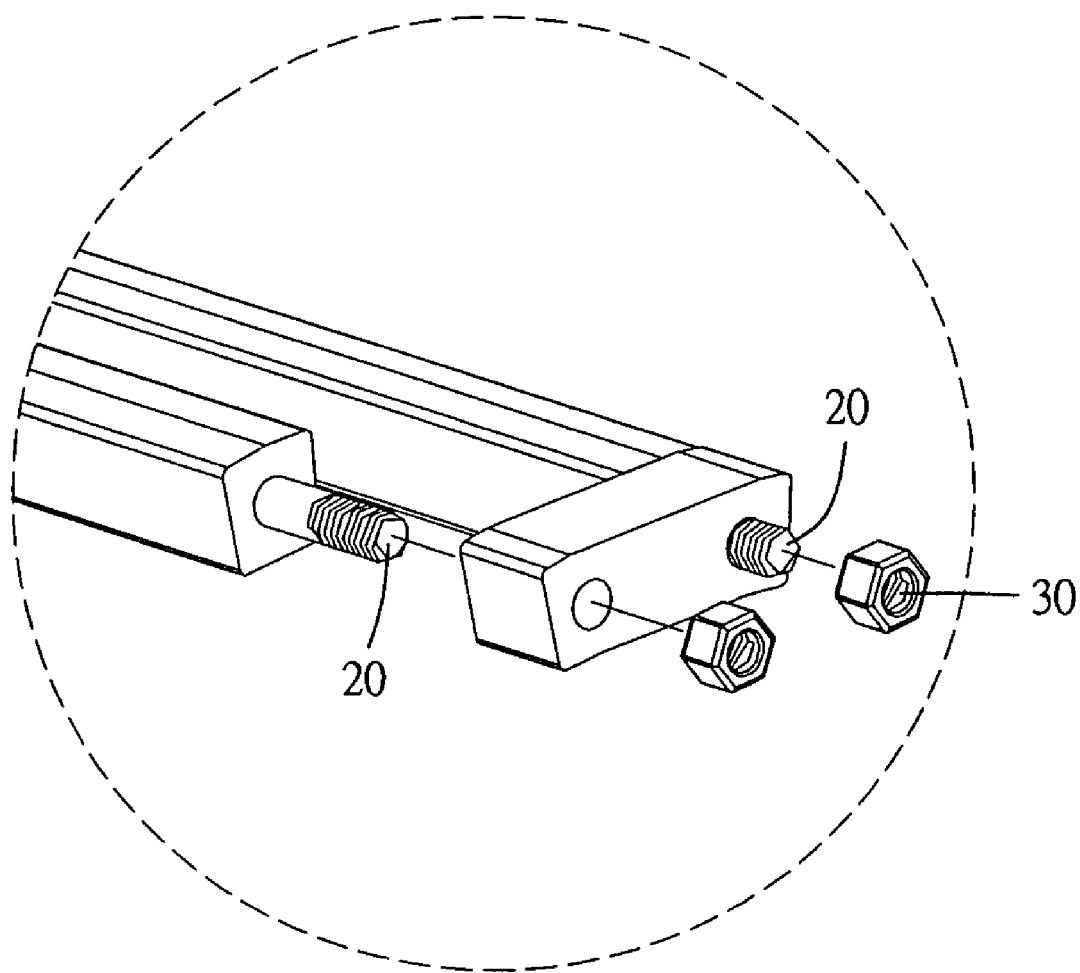
FIG. 17 is an exploded perspective view of the portion marked D in FIG. 16.

A fifth preferred embodiment of the stator coil winding structure of a motor or a generator in the present invention, as shown in FIGS. 16 and 17, includes the intermediate different-shaped rod conductors and the front conductors and the rear conductors connected together. Every two conductors are connected by soldering or having the two position pins 20 on the opposite ends of the intermediate different-shaped rod conductor thread-milled and then respectively inserted through the front and the rear conductor and locked by nuts 30.

Figure 18:
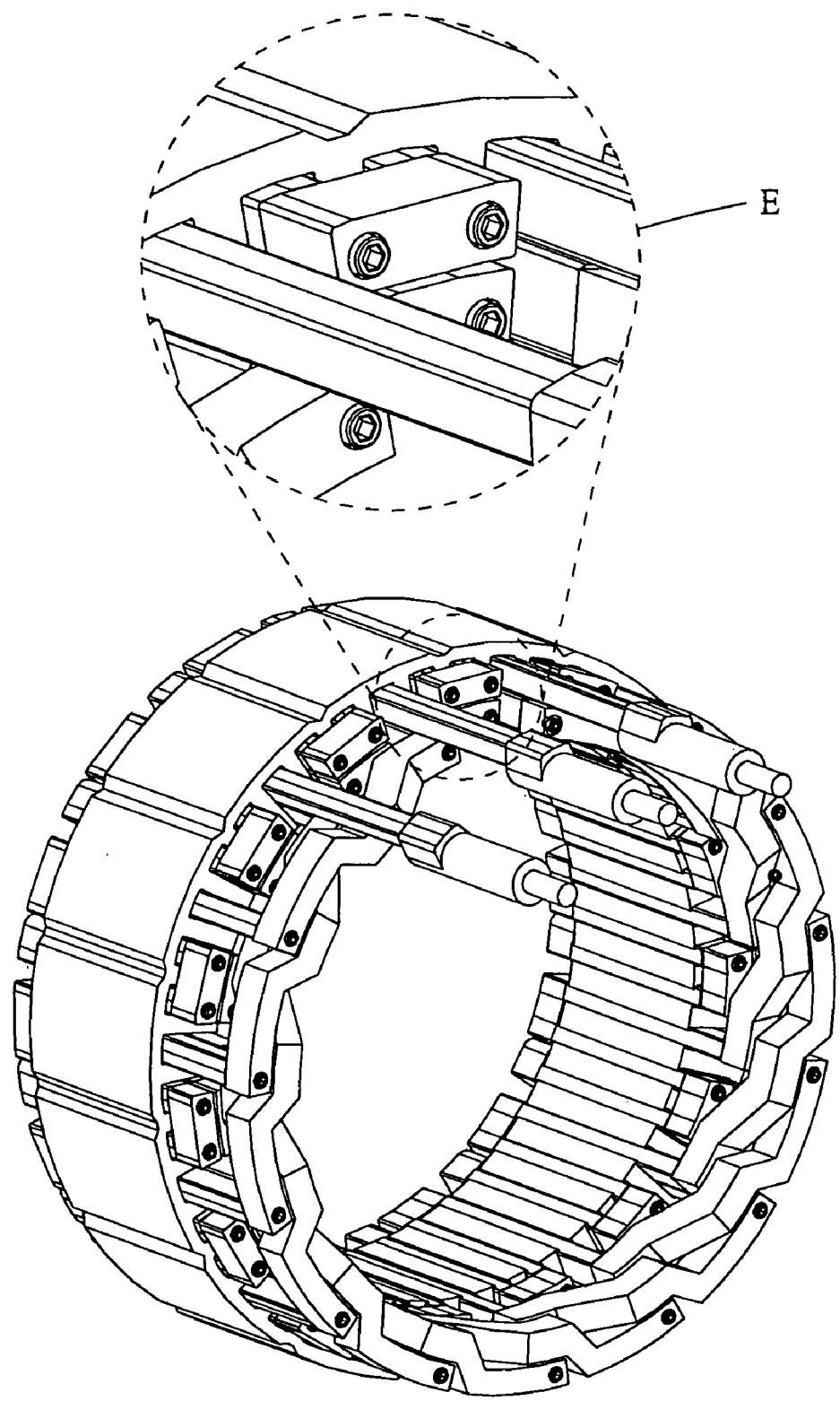
FIG. 18 is a perspective view of a sixth preferred embodiment of an inner rotor motor having two conductors in each coil slot connected by bolts in the present invention.
Figure 19:
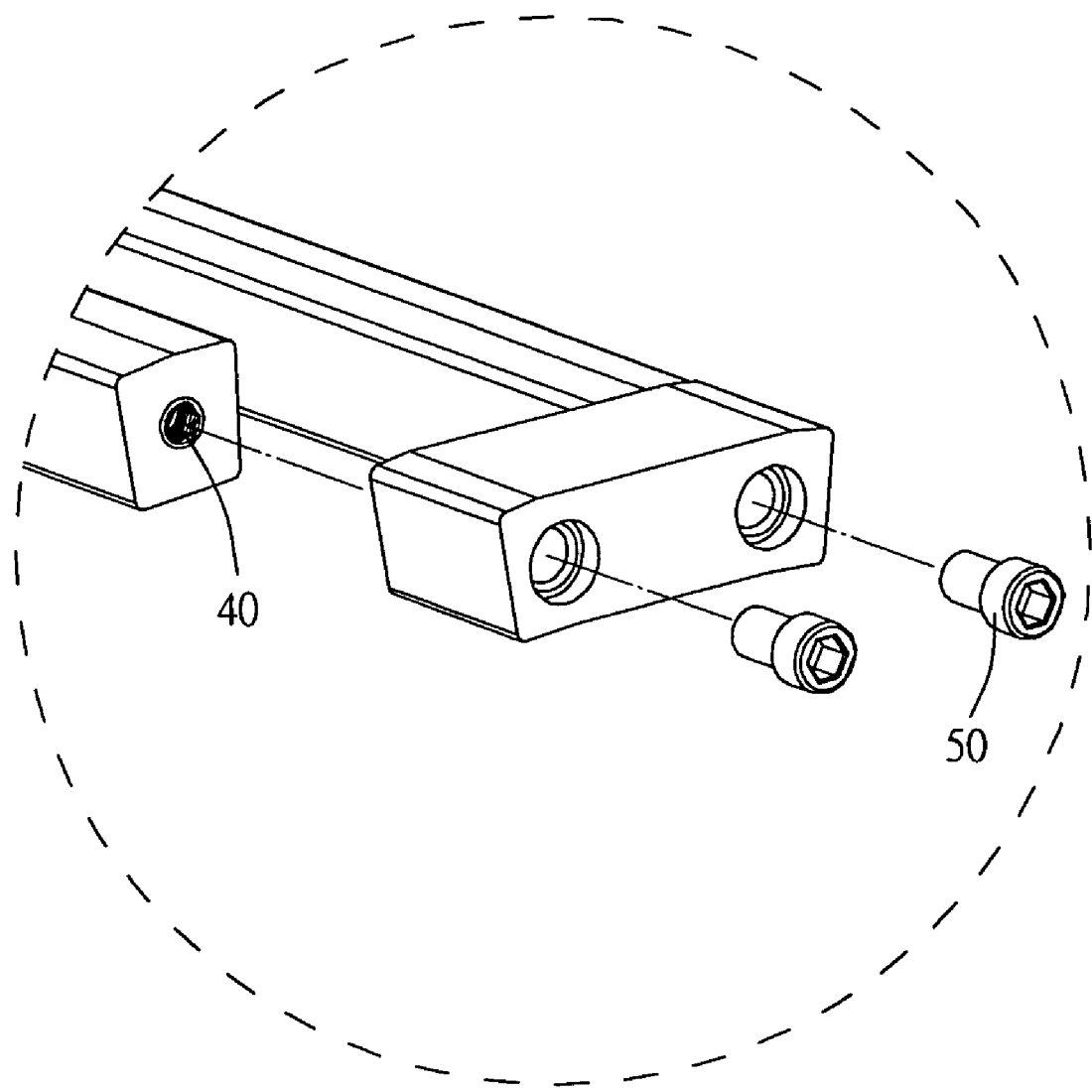
FIG. 19 is an exploded perspective view of the portion marked E in FIG. 18.

A sixth preferred embodiment of the stator coil winding structure of a motor or a generator in the present invention, as shown in FIGS. 18 and 19, includes the intermediate different-shaped rod conductors and the front conductors and the rear conductors connected together. Every two conductors are connected by soldering or having the opposite ends of the intermediate different-shaped rod conductor 11 respectively bored with a threaded hole 40 to be locked with the front and the rear conductor by bolts 50. The fifth and the sixth embodiment are a little simplified in their assembly.

Figure 20:
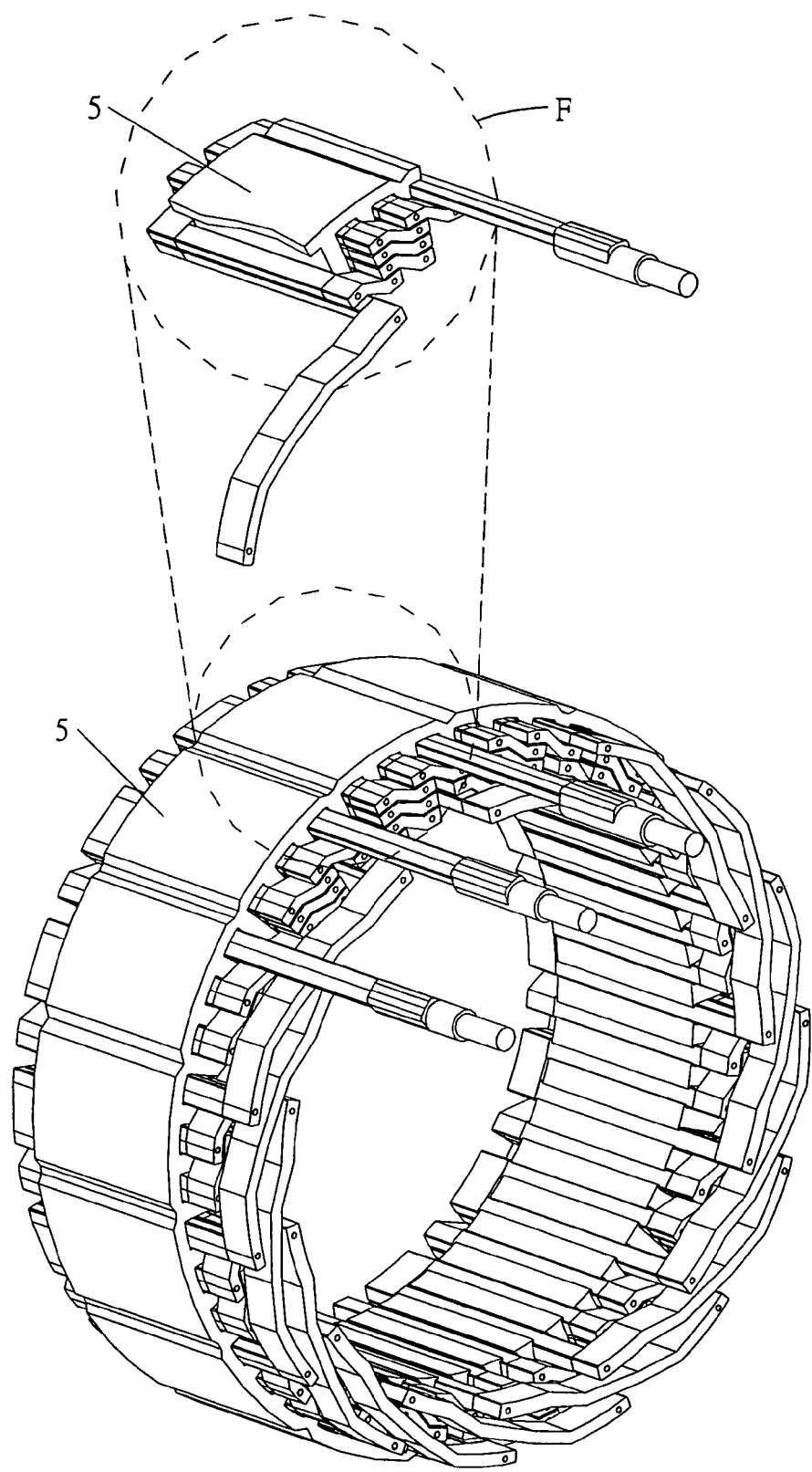
FIG. 20 is a perspective view of a seventh preferred embodiment of the stator of an inner rotor motor in the present invention.
Figure 21:
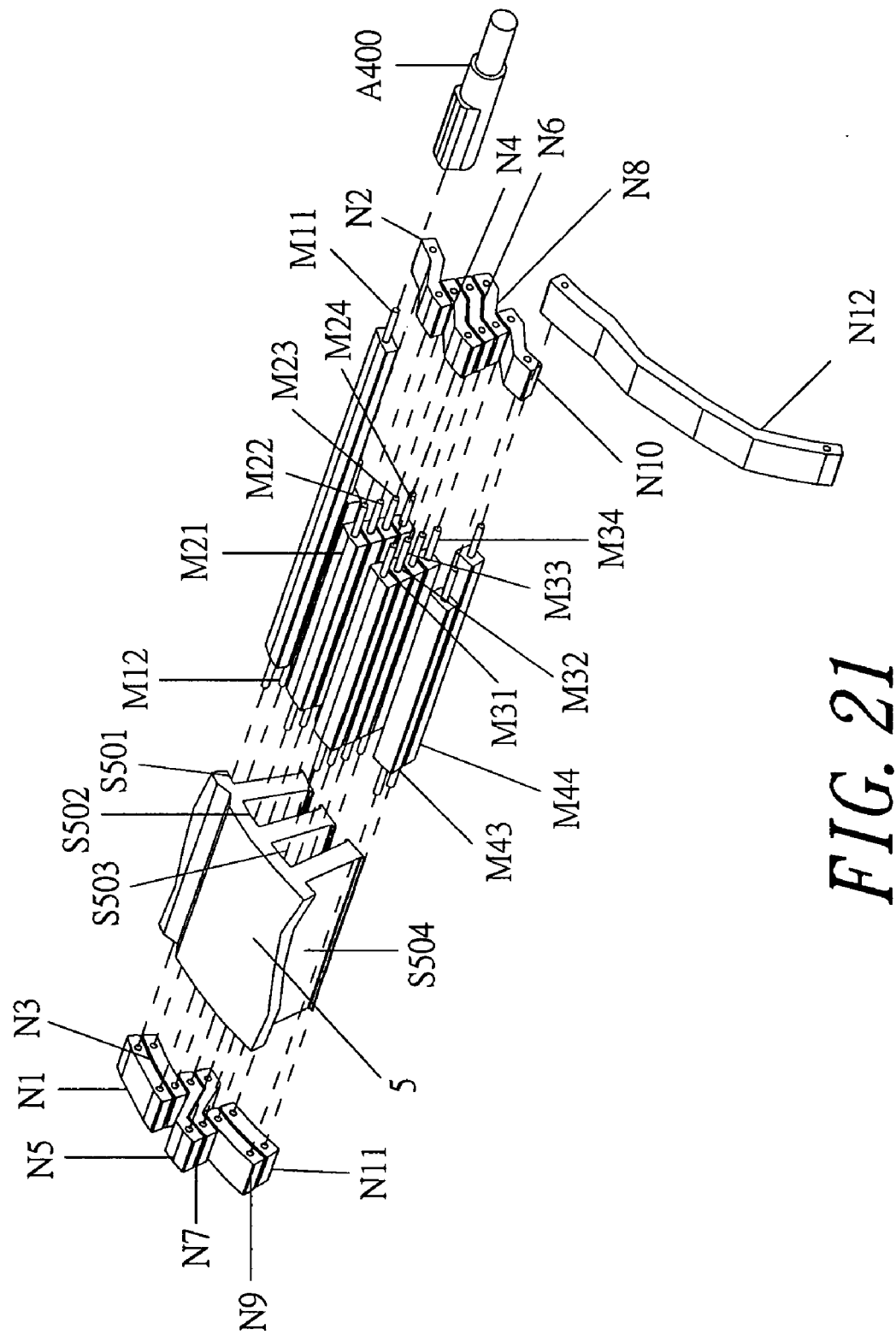
FIG. 21 is an exploded perspective view of the portion marked F in FIG. 20.

A seventh preferred embodiment of the stator coil winding structure of an inner rotor motor in the present invention, as shown in FIGS. 20 and 21, includes intermediate different-shaped rod conductors, front conductors and rear conductors connected together. The coil slot (S501), (S502), (S503) and (S504) of the stator 5 are respectively inserted therein with the input terminal (A400) of A-phase power and the intermediate different-shaped rod conductors (M11), (M12), (M21), (M22), (M23), (M24), (M31), (M32), (M33), (M34), (M43), (M44) and the front conductors (N2), (N4), (N6), (N8), (N10), (N12) and the rear conductors (N1), (N3), (N5), (N7), (N9), (N11) connected together to form a collective winding structure having four conductors in each coil slot.

To sum up, this invention has the following advantages.

1. The separated stator coil winding structure is applicable to various motors of different powers by increasing the wire-wound number of the coil and changing the number of the conductors in each coil slot.

2. It can avoid short circuit and prevent conductors from being bent when they go in and come out of the coil slots during coil winding.

3. It is able to increase a slot occupied rate of conductors and reduce copper loss during output of large current.

While the preferred embodiments of the invention have been described above, it will be recognized and understood that various modifications may be made therein and the appended claims are intended to cover all such modifications that may fall within the spirit and scope of the invention.

I claim:

1. A stator winding structure of a motor or a generator comprising separated different-shaped rod conductors, said different-shaped rod conductors being combined together to form a collective winding structure to take the place of the conventional coil wire, said stator winding structure comprising a silicon-steel sheet stator, a plurality of different-shaped rod conductors, front conductors and rear conductors, said silicon-steel sheet stator bored with plural coil slots, said different-shaped rod conductors insulated mutually to be inserted in said coil slots of said stator, said front and said rear conductors and said different-shaped rod conductors connected together to form said collective winding structure according to a sequence designed, the contact surfaces of said rod conductors with said front and said rear conductors and the connecting surfaces of said rod conductors with an input terminal for electric power being conductive, the other surfaces of said conductors of said stator being insulated for avoiding a short circuit and preventing conductors from being bent during their winding process, said stator structure able to increase a slot occupied rate of said conductors and to reduce copper loss during output of large current,
- wherein each said front conductor and each said rear conductor are respectively bored with two position holes, and each said different-shaped rod conductor has its opposite ends respectively provided with a position pin to be inserted in said position hole of said front and said rear conductor, said position pin being inserted in said position hole in sequence and connected by soldering, and
- wherein said position pin at the opposite ends of said different-shaped rod conductor is formed with male threads onto which a nut is screwed after said position pin is inserted through said position hole of said front and said rear conductor.

2. The stator winding structure of a motor or a generator as claimed in claim 1, wherein said stator winding structure is applicable to an outer stator of an inner rotor motor or generator.

3. The stator winding structure of a motor or a generator as claimed in claim 1, wherein said stator winding structure is applicable to an inner stator of an outer rotor motor or generator.

4. The stator winding structure of a motor or a generator as claimed in claims 1, wherein said different-shaped rod conductor has its opposite ends connected with said front and said rear conductor by bolts.

5. A stator winding structure of a motor or a generator comprising separated different-shaped rod conductors, said different-shaped rod conductors being combined together to form a collective winding structure to take the place of the conventional coil wire, said stator winding structure comprising a silicon-steel sheet stator, a plurality of different-shaped rod conductors, front conductors and rear conductors, said silicon-steel sheet stator bored with plural coil slots, said different-shaped rod conductors insulated mutually to be inserted in said coil slots of said stator, said front and said rear conductors and said different-shaped rod conductors connected together to form said collective winding structure according to a sequence designed, the contact surfaces of said rod conductors with said front and said rear conductors and the connecting surfaces of said rod conductors with an input terminal for electric power being conductive, the other surfaces of said conductors of said stator being insulated for avoiding a short circuit and preventing conductors from being bent during their winding process, said stator structure able to increase a slot occupied rate of said conductors and to reduce copper loss during output of large current, wherein said different-shaped rod conductors and said front and said rear conductors are U-shaped.

6. A stator winding structure of a motor or a generator comprising separated different-shaped rod conductors, said different-shaped rod conductors being combined together to form a collective winding structure to take the place of the conventional coil wire, said stator winding structure comprising a silicon-steel sheet stator, a plurality of different-shaped rod conductors, front conductors and rear conductors, said silicon-steel sheet stator bored with plural coil slots, said different-shaped rod conductors insulated mutually to be inserted in said coil slots of said stator, said front and said rear conductors and said different-shaped rod conductors connected together to form said collective winding structure according to a sequence designed, the contact surfaces of said rod conductors with said front and said rear conductors and the connecting surfaces of said rod conductors with an input terminal for electric power being conductive, the other surfaces of said conductors of said stator being insulated for avoiding a short circuit and preventing conductors from being bent during their winding process, said stator structure able to increase a slot occupied rate of said conductors and to reduce copper loss during output of large current, wherein said different-shaped rod conductors and said front and said rear conductors are L-shaped.

* * * * *